United States Patent [19]

Vandersall

[11] 4,272,414
[45] Jun. 9, 1981

[54] CHEMICAL RETARDANTS FOR FOREST FIRES

[75] Inventor: H. Lawrence Vandersall, Upland, Calif.

[73] Assignee: Monsanto Company, St. Louis, Mo.

[21] Appl. No.: 48,566

[22] Filed: Jun. 14, 1979

Related U.S. Application Data

[63] Continuation-in-part of Ser. No. 909,903, May 26, 1978, abandoned.

[51] Int. Cl.³ .......................... C09D 5/18; C09K 3/28
[52] U.S. Cl. ................................ 252/602; 106/14.12; 106/14.34; 106/14.35; 252/2; 252/8.05; 252/601; 252/607
[58] Field of Search ............... 252/2, 8.05, 8.1, 601, 252/602, 607; 106/14.12, 14.34, 14.35

[56] References Cited

U.S. PATENT DOCUMENTS

| | | | |
|---|---|---|---|
| 1,030,909 | 7/1912 | Mesturino | 252/8.1 |
| 3,326,890 | 6/1967 | Engelskirchen et al. | 252/316 X |
| 3,345,289 | 10/1967 | Freifeld et al. | 252/2 X |
| 3,409,550 | 11/1968 | Gould | 252/8.1 |
| 3,808,195 | 4/1974 | Shelso et al. | 536/52 |
| 4,101,485 | 7/1978 | Brooks et al. | 252/2 X |

FOREIGN PATENT DOCUMENTS

50-14479  5/1975  Japan ............................................. 252/2

*Primary Examiner*—Richard D. Lovering
*Attorney, Agent, or Firm*—S. M. Tarter; H. Croskell; W. H. Duffey

[57] ABSTRACT

Fire retardant compositions comprising (a) ammonium sulfate; (b) a carboxyalkyl or hydroxyalkyl ether of a polygalactomannan; and optionally (c) other fire retardant chemicals from the groups consisting of monoammonium orthophosphate, diammonium orthophosphate; monoammonium pyrophosphate; diammonium pyrophosphate; triammonium pyrophosphate; tetraammonium pyrophosphate; ammonium, substituted ammonium, amide and melamine polyphosphates; ammonium-alkali metal mixed salts of ortho-, pyro- and polyphosphates; ammonium-alkaline earth metal mixed salts of ortho-, pyro- and polyphosphates; and mixtures thereof. There are disclosed both aqueous forms and concentrated non-aqueous forms of the compositions which are particularly useful for preventing, extinguishing and suppressing forest fires.

21 Claims, No Drawings

CHEMICAL RETARDANTS FOR FOREST FIRES

CROSS REFERENCE TO RELATED APPLICATIONS

This is a continuation-in-part of copending application Ser. No. 909,903 filed May 26, 1978, now abandoned.

BACKGROUND OF THE INVENTION

1. Field of the Invention

The present invention relates to chemical retardants which may be applied by various application methods including aerial bombardment of forest, rangelands, brushland and other areas for preventing, extinguishing or suppressing fires therein.

2. Description of the Prior Art

Forest, brush and rangeland fires causes enormous damage each year. Not only is the direct property loss due to such fires enormous, but associated soil erosion and watershed problems are also significant. It is important, therefore, to minimize and control the spread of forest fires whenever possible.

Forest fire retardants may be classified as short-term or long-term retardants. Short-term retardants, as defined in U.S. Pat. No. 3,553,128, rely solely upon the water they contain to retard combustion. Long-term retardants contain, in addition to water, a chemical that effectively retards flaming combustion even after the water has evaporated.

At present, the most commonly used retardant chemicals are ammonium salts such as monoammonium orthophosphate, diammonium orthophosphate, condensed ammonium phosphate moieties which exist in fertilizer solution, ammonium sulfate and the like. SUch ammonium salts are usually employed in aqueous solution to facilitate spraying from mobile ground application equipment or for aerial bombardment from fixed-wing aircraft or helicopters. Functionally, the water serves primarily as a carrier for the chemical retardants.

It is common practice to thicken long-term retardants with additives in order to improve their capabilities with respect to placement or confinement on the target, the target being the timber or other foliage which constitutes the fuel for combustion. Such additives also can improve adherence of the retardants to the fuel surface; can help retain moisture; can create a moisture barrier buildup between the fuel and the flame; and can improve deposition of the retardant on the fuel surface.

In the aerial application of liquid materials for preventing, retarding and suppressing fires, such as commonly undertaken using fixed-wing aircraft, the prior art has recognized that solutions of low viscosity, when dropped from substantial elevations, usually tend to atomize and therefore cannot be relied upon to descend with sufficient concentration on specific target areas. It has been found that liquid fire suppressing materials having high viscosity, for example 1,500 to 2,500 centipoises, and cohesive properties, when dropped from substantial elevations, tend to hold together such that these liquids can be confined to a specific target area and will descend thereupon with sufficient concentrations to be effective.

As pointed out in U.S. Pat. No. 3,196,108, most thickening agents for increasing the viscosity and cohesive properties of aqueous solutions are not compatible with the most effective fire suppressing chemicals available. Furthermore, it is stated therein that many of the fire retardant chemicals which are compatible with some thickeners have such a low fire retarding capacity that great amounts of these fire retardant materials must be employed when used with compatible thickeners. It has also been found, according to U.S. Pat. No. 3,196,108, that some of the fire suppressing materials used are effective when wet but have little or no value when dried.

Among the additives known for use in modifying the rheological properties of ammonium phosphate solutions are the galactomannan gums, sometimes called polygalactomannans. U.S. Pat. No. 3,634,234 describes the use of galactomannan gums in such solutions. The galactomannan materials are polysaccharides, generally termed hemicelluloses, and are long-chain polymers of galactose and mannose units. They are gum-like materials generally found in plant seeds. Examples of the galactomannans are guar gum; locust bean gum; and tara gum. These materials typically comprise about 5-15 percent by dry weight of the ammonium phosphate composition according to U.S. Pat. No. 3,634,234.

For reasons not entirely understood, certain galactomannan materials have been found to be incompatible with ammonium sulfate (an effective fire retardant chemical) when employed in forest fire retarding solutions. For this reason, it has been traditional to thicken ammonium sulfate solutions with clay instead of polygalactomannans. U.S. Pat. No. 3,196,108 exemplifies typical prior art ammonium sulfate solutions containing attapulgite clay thickeners.

In air drop test comparisons, gum-thickened retardants have been found to exhibit improved rheological properties over clay-thickened retardants. For example, gum-thickened retardants were found to produce larger droplet sizes and to experience less erosion and drift during a drop thus resulting in more concentrated patterns. Also, drop times were shorter for gum-thickened retardants. With these improved properties, higher effective drop heights may be achieved. This increases safety in air dropping operations and could enable larger aircraft to be used for air dropping. However, due to the aforementioned incompatibility problem with ammonium sulfate, the advantages accuring from the use of polygalactomannan gum thickeners have heretofore inured only to the benefit of ammonium phosphate solutions.

If it were possible to gum-thicken aqueous ammonium sulfate solutions, it is believed that a superior product (relative to clay-thickened ammonium sulfate solutions) could be produced. Furthermore, since ammonium sulfate solutions have been found inferior to ammonium phosphate in prevention of glowing combustion, a further improvement might be realized by admixing ammonium sulfate and ammonium phosphate in a single fire retardant composition. Admixtures of ammonium sulfate and diammonium phosphate in aqueous fire retardant compositions are disclosed in U.S. Pat. No. 3,409,550. The preferred water-miscible thickener in that disclosure was carboxymethyl cellulose. Polygalactomannans were not disclosed.

It is an object of the present invention, therefore, to provide aqueous ammonium sulfate solutions containing certain derivatives of polygalactomannans which are compatible with ammonium sulfate and which afford the necessary rheological properties of the resulting fire retardant solution. Another object of the present invention is to provide forest fire retardants comprising aqueous solutions of such polygalactomannan derivatives in combination with admixtures of ammonium sulfate and ammonium phosphate. These and other objects of the present invention will become apparent from the following description.

SUMMARY OF THE INVENTION

The improved fire retardant compositions of this invention, in concentrated non-aqueous form, comprise the following components:

(a) from about 10 to about 90 percent by weight of ammonium sulfate;

(b) from 0 to about 90 percent by weight of an ammonium salt selected from the group consisting of monoammonium orthophosphate; diammonium orthophosphate; monoammonium pyrophosphate; diammonium pyrophosphate; triammonium pyrophosphate; tetraammonium pyrophosphate; ammonium, substituted ammonium, amide and melamine polyphosphates; ammonium-alkali metal mixed salts of ortho-, pyro- and polyphosphates; ammonium-alkaline earth metal mixed salts of ortho-, pyro- and polyphosphates; and mixtures thereof; and (c) from about 0.1 to about 30 percent by weight of a polygalactomannan derivative selected from the group consisting of carboxyalkyl ethers of polygalactomannans and hydroxyalkyl ethers of polygalactomannans.

Aqueous solutions of the chemical retardants of this invention have been found to exhibit excellent rheological properties for aerial application in fire retardation of forest, rangeland, brushland and similar type fires. Unexpectedly, the particular polygalactomannan derivatives disclosed herein are found to be compatible with ammonium sulfate alone as well as ammonium sulfate in admixture with ammonium phosphate.

DESCRIPTION OF THE INVENTION AND PREFERRED EMBODIMENTS

The derivatives of polygalactomannans useful in the present invention are carboxyalkyl ethers of polygalactomannans and hydroxyalkyl ethers of polygalactomannans. The term "polygalactomannans" as used herein includes the general class of polysaccharides containing both galactose and mannose units. Guar gum is a preferred polygalactomannan for use in the present invention.

Carboxyalkyl ethers of galactomannan gums prepared from halo fatty acids have been known in the prior art, e.g., U.S. Pat. No. 2,520,161. Another process for preparing carboxyalkyl ethers of polygalactomannan gums is disclosed in U.S. Pat. No. 3,712,883. The teachings in these patents include methods for preparing alkali metal salts of these carboxyalkyl ethers of polygalactomannan gums and these salt forms are within the scope of the present invention.

Generally, in the compositions of this invention, it is preferred that the alkyl group of the carboxyalkyl ethers contains from 1 to 8 carbon atoms. Even more preferred is that the alkyl group be a $C_1$ to $C_3$ alkyl.

Hydroxyalkyl ethers of polygalactomannans are preferred for the present invention. Preferred are hydroxyalkyl ethers wherein said alkyl contains from 2 to 8 carbon atoms. Such ethers, in particular the hydroxyethyl and hydroxypropyl ethers, are well known. Hydroxyalkyl ethers of polygalactomannans, and especially those ethers of guar gum, have been made by the reaction of the polygalactomannans with an alkylene oxide (about 0.1 to 6.0 equivalents per equivalent of the polygalactomannan) in the presence of alkali metal or alkaline earth metal hydroxide. The reaction can be conducted at room temperature or elevated temperatures and at atmospheric or higher pressures. The alkylene oxide reacts with hydroxyl groups present in the polygalacomannan.

Hydroxyalkyl ethers as above described may be prepared from alkylene oxides having up to 8 carbon atoms. Generally, the oxirane group is a terminal vicinal epoxy group. Such alkylene oxides may be represented by the following formula:

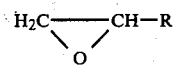

where R is hydrogen or an alkyl group having from 1 to 6 carbon atoms. R is preferably hydrogen or methyl, representing ethylene oxide and propylene oxide, respectively. R may also, however, be ethyl, propyl, butyl, amyl, hexyl and the like.

Basically, the hydroxyalkyl ethers are prepared by the reaction of the polygalactomannan with the alkylene oxide in the presence of an alkaline catalyst. For convenience, the reaction will hereinbelow be described with reference to guar gum and propylene oxide to provide the hydroxypropyl ether or polyhydroxypropyl ether of guar gum. Commercially available guar gum generally contains from about 8 to 15 percent moisture by weight. In guar gum, the basic unit of the polymer is comprised of two mannose units with a glycosidic linkage and a galactose unit attached to one of the hydroxyls of the mannose units. On the average, each of the sugar units has three available hydroxyl sites, all of which may react.

The rate of reaction is dependent on the catalyst concentration and the temperature. Temperatures substantially higher than room temperature will generally require pressure equipment or solvent reflux. Average reaction efficiency is in the range of 60 to 80 percent. The reaction may be illustrated in its simplest, idealized form by the following equation:

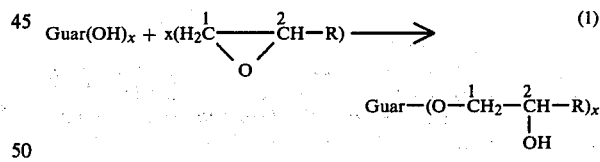

The final product may be more conveniently shown by the formula

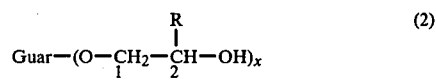

This latter formula more clearly illustrates the attachment of the R group to the same carbon atoms as the hydroxyl group, the hydroxyl group being attached to a secondary carbon atom. With propylene oxide the R group is methyl, and with ethylene oxide R is hydrogen. With other alkylene oxides having a terminal, vicinal epoxide group, the R group will be an alkyl group having two carbon atoms less than the alkylene group of the alkylene oxide. "Guar" in the formulae herein represents guar minus x number of hydroxyl groups capable of reacting with the alkylene oxide and x is an integer from 1 to 3 for an anhydrohexose unit of guar.

Formula (2) above represents the idealized formula for such hydroxyalkyl ether species. As indicated above, each sugar unit contains three hydroxyl groups which may react with the alkylene oxide. In such a case, x is an integer from 1 to 3 in any one sugar unit of the guar gum. It is possible to have a degree of substitution greater than 3 as the alkylene oxide may also react with the hydroxyl group attached to the secondary carbon atom of the alkyl group subsequent to the reaction of a molecule of alkylene oxide with one of the reactive hydroxyl groups of the polygalactomannan. In such event, the hydroxyalkyl ether product may be illustrated by the formula

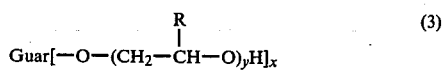

(3)

where x is an integer up to 3 and y is an integer dependent on the degree of substitution, which as a practical matter, is rarely in excess of 3. It is difficult to specify the exact integers for x and y in any one specific product, and accordingly, the product is described by reference to the degree of substitution which indicates the amount of alkylene oxide reacted.

In view of their complex nature, it is difficult to define the described ethers by any simple chemical name. The products are most conveniently defined as a hydroxyalkyl ether of a polygalactomannan in which the alkyl group has 2 to 8 carbon atoms and the hydroxyl group is attached to a secondary carbon atom. In this manner, both the idealized simple ethers and the complex producs are encompassed. In the idealized formula (2) above, the product would be mono- or poly-2-hydroxy, 2-alkylethyl-guar ether in which the alkyl group has from 1 to 6 carbon atoms, or if R is hydrogen, mono- or poly-2-hydroxy, ethyl-guar ether. The products may, of course, also be described by reference to the reactants.

Methods for preparing hydroxyalkyl ethers of galactomannans are set forth in U.S. Pat. No. 3,326,890. Methods are also described in U.S. Pat. Nos. 3,723,408 and 3,723,409, wherein it is also disclosed that the hydration rate of the hydroxyalkyl polygalactomannans may be increased by reaction with a certain halo fatty acid or alkali metal salt thereof, and these modified hydroxyalkyl polygalactomannans are also useful in this invention.

Exemplary hydroxyalkyl ethers of polygalactomannans are hydroxyethyl and hydroxypropyl ethers thereof and these ethers are preferred for use herein. More preferred are these ethers of guar gum, with the hydroxypropyl ether of guar gum being most preferred.

Exemplary carboxyalkyl ethers of polygalactomannans are carboxyethyl ether locust bean gum; carboxyethyl ether guar gum; and carboxymethyl ether guar gum.

Such ether derivatives of polygalactomannans are described in U.S. Pat. No. 3,808,195. This patent also describes a process for incorporating a material containing a borate ion into carboxyalkyl ethers and hydroxyalkyl ethers of polygalactomannans to render them dispersible. These modified ether derivatives may also be employed in the compositions of this invention.

As would be known to those skilled in the art, carboxyalkyl ethers and hydroxyalkyl ethers of polygalactomannans can vary widely in degree of substitution. By "degree of substitution" as used herein is meant the average substitution of carboxyalkyl ether or hydroxyalkyl ether groups, as the case may be, per anhydro sugar unit. Thus, for example, in guar gum, on the average, each of the sugar units has three available hydroxyl sites, all of which may react. If each hydroxyl site is reacted to form a hydroxyalkyl ether or carboxyalkyl ether the degree of substitution would be 3. If on the average one-third of the hydroxyl groups are so reacted the degree of substitution would be 1. As was previously mentioned, a degree of substitution greater than 3 is possible for the hydroxyalkyl ether polygalactomannans if further reaction occurs with the hydroxyl on the hydroxyalkyl ether group. In general, however, a degree of substitution of about 4 or 5 is considered the practical upper limit for these derivatized polygalactomannans. The carboxyalkyl ethers and hydroxyalkyl ethers of polygalactomannans employed in the present invention can have a low degree of substitution, for example 0.01 or even lower, with 0.05 being a more typical low degree of substitution.

It is difficult to set a range for the degree of substitution generally applicable to the various polygalactomannan derivatives which may be employed in the present invention. The degree of substitution may vary widely and still provide effective derivatized polygalactomannans for use in the present invention. An effective degree of substitution would be considered that which provides a derivatized polygalactomannan which results in less than a 30 percent loss in viscosity in 30 days when evaluated substantially in accordance with the test method of Example IV hereinafter, the presence of the additives mentioned in that Example IV not being deemed critical for purposes of this test. A preferred degree of substitution is from about 0.03 to about 2, more preferably 0.03 to about 1.5.

Ammonium sulfate is an essential component in the compositions of this invention and is the preferred ammonium salt for use herein as the fire retardant chemical to be thickened with the polygalactomannan derivatives disclosed herein. Ammonium sulfate (sometimes called diammonium sulfate) has the formula $(NH_4)_2SO_4$. The aqueous ammonium sulfate solutions useful herein may be of any concentration, limited only by solubility and suitability to the specific purposes for which the ammonium sulfate solutions are intended. The preferred concentration of ammonium sulfate in aqueous solutions suitable for use in fighting forest fires is from about 5 to about 40 percent by weight of the total composition. Even more preferred are concentrations of ammonium sulfate from about 20 to about 40 percent by weight of the total composition.

In the practice of the present invention, one or more of the polygalactomannan derivatives is present in the ammonium sulfate solution in an effective amount for achieving the desired rheological properties. Generally, in aqueous solutions suitable for use in fighting forest fires, the polygalactomannan derivative is present in an amount from about 0.005 to about 5 percent and preferably from about 0.01 to about 3 percent by weight of the aqueous composition. Greater amounts of the polygalactomannan derivatives may be employed, however, when a higher viscosity material is desired.

The compositions of this invention may also be in a concentrated non-aqueous form which, when needed for application, could be diluted with water to form a solution suitable for use in fighting forest fires. With respect to the concentrated non-aqueous form of the fire retardant compositions of this invention, the ammonium sulfate is present at from about 10 to about 90 percent and preferably from about 30 to about 90 percent by weight of the concentrated composition. Even more preferred is a concentration of ammonium sulfate from about 50 to about 90 percent by weight of the concentrated composition. In these concentrated compositions, the polygalactomannan derivative is present in the range of from about 0.1 to about 30 percent by weight of the concentrated non-aqueous composition. Preferably, the polygalactomannan derivative is present at about 1.0 to about 15 percent by weight of the concentrated non-aqueous composition, more preferably from about 2.0 to about 10 percent by weight.

It is sometimes desirable to admix with the ammonium sulfate chemical retardant a quantity of an ammonium salt selected from the group consisting of monoammonium orthophosphate; diammonium orthophosphate; monoammonium pyrophosphate; diammonium pyrophosphate; triammonium pyrophosphate; tetraammonium pyrophosphate; ammonium, substituted ammonium, amide and malamine polyphosphates; ammonium-alkali metal mixed salts of ortho-, pyro- and polyphosphates; ammonium-alkaline earth metal mixed salts of ortho-, pyro- and polyphosphates; and mixtures thereof. The amonium salts of this group may be present in the aqueous composition of this invention at from about 0 to about 20 percent by weight of the total composition. A preferred range in the aqueous composition is from about 0 to about 10 percent. In the concentrated non-aqueous compositions of this invention, the salts of this group may be present at from about 0 to about 90 percent by weight of the concentrated composition. A preferred range for the concentrated composition is from about 0 to about 70 percent and more preferred is 0 to 50 percent.

Those skilled in the art will recognize the various mixed salts of ammonium and alkali metal or alkaline earth metal which are included in this invention. For example, these mixed salts include monoammonium and diammonium othophosphates containing one or more alkali metal or alkaline earth metal cations; di-, tri- and tetraammonium pyrophosphates containing one or more alkali metal or alkaline earth metal cations; and polyphosphates containing both ammonium and alkali metal or alkaline earth metal cations. Typical mixed cation salts include NH$_4$MHPO$_4$, (NH$_4$)$_2$MPO$_4$ and NH$_4$M$_2$PO$_4$ wherein M is an alkali metal cation, preferably sodium or potassium. Magnesium ammonium phosphate (MgNH$_4$PO$_4$.6H$_2$O) exemplifies an alkaline earth metal ammonium phosphate.

The ammonium polyphosphates useful in this invention can be prepared by methods well-known in the art, for example, by heat treating phosphates such as urea phosphate with a combined ammoniating and condensing agent such as urea or melamine. These ammonium polyphosphates are compounds containing a P-O-P type linkage, having the general formula $$H_{(n-m)+2}(NH_4)_m P_n O_{3n+1}$$

wherein n is an integer from 3 to about 400 and m is an integer from 1 to n+2. These polyphosphates can be water soluble or water insoluble. In the preparation of these polyphosphates a substantially water-insoluble product is obtained when the integer n has an average value greater than 10 and m/n is between about 0.7 and about 1.1. The physical characteristics of these ammonium polyphosphates and the various processes for preparing them are described in U.S. Pat. No. 3,397,035 dated Aug. 13, 1968. The average value of n in the foregoing formula is determined by the end group titration method [Van Wazer et al, Anal. Chem. 26, 1755 (1954)]. Water solubility of the polyphosphate is increased as the degree of ammoniation is lowered and as the polymer chain length is decreased.

Illustrative but nonlimiting examples of other ammonium polyphosphates useful herein are hexammonium tetrapolyphosphates described in U.S. Pat. No. 3,314,751 to Griffith; ammonium pyrophosphates described in U.S. Pat. No. 3,645,675 to Sears et al; long-chain crystalline ammonium polyphosphates described in U.S. Pat. No. 3,912,802 to McCullough et al; and anhydrous ammonium polyphosphates described in U.S. Pat. No. 3,333,921 to Knollmueller.

Nonlimiting examples of substituted ammonium polyphosphates useful herein are mixed cation ammonium potassium polyphosphates described in U.S. Pat. No. 3,549,347 to Lyons et al; potassium ammonium polyphosphates described in U.S. Pat. No. 3,911,086 to Sheridan et al; and substituted ammonium polyphosphates described in U.S. Pat. No. 4,043,987 to C. R. Jolicoeur et al.

Typical amide polyphosphates are described in U.S. Pat. No. 3,926,990 and U.S. Pat. No. 3,969,291, both to Fukuba et al.

Melamine polyphosphates, sometimes known as melamine pyrophosphates, are described in U.S. Pat. No. 4,003,861 to Savides et al.

When the ammonium sulfate-polygalactomannan compositions of this invention are diluted with water to obtain a fire retardant composition having suitable properties for aerial or ground application deployment, the final aqueous solution may contain various corrosion inhibitors, colorants, surfactants and other well-known additives.

To illustrate the fire retardant compositions of this invention, numerous formulations were prepared and tested. Viscosity, pH and corrosion properties were observed on various aqueous solutions within the scope of this invention. Comparative testing was also carried out to illustrate the incompatibility of ammonium sulfate with certain prior art polygalactomannan gums outside the present invention. All parts and percentages in the following Examples are by weight, unless otherwise specified.

The following Examples I—III illustrate the preparation of aqueous fire retardant compositions based on ammonium sulfate containing a polymeric non-derivatized hydroxylated guar gum outside the scope of this invention. The viscosity measurements were made using a Model LTV Brookfield viscometer, Spindle No. 4 at 60 revolutions per minute.

EXAMPLE I

To 72.36 grams of ammonium sulfate was added 0.48 grams of iron oxide, 0.10 grams of a sulfur-containing corrosion inhibitor and 2.90 grams of a non-derivatized hydroxylated guar gum. The aforementioned components were dry blended and were then added to 350 ml. of water in which 3 drops of a polyoxyethylenepolyoxypropylene antifoaming reagent had been dispersed. Viscosity characteristics of the resulting aqueous solution are presented in Table 1 below at various stages of aging.

EXAMPLE II

To 36.18 grams of ammonium sulfate was added 21.28 grams of diammonium orthophosphate. Thereafter, 0.48 grams of iron oxide, 0.10 grams of a sulfur-containing corrosion inhibitor and 2.90 grams of the hydroxylated guar gum described in Example I were added. These ingredients were dry blended and then an aqueous solution was prepared according to the procedure of Example I. Viscosity stability results are presented in Table 1.

EXAMPLE III

To 42.57 grams of diammonium orthophosphate was added 0.48 grams of iron oxide, 0.10 grams of a sulfur-containing corrosion inhibitor and 2.90 grams of the hydroxylated guar gum described in Example I. These ingredients were dry blended and then an aqueous solution was prepared according to the procedure of Example I. Viscosity stability results are presented in Table 1.

TABLE 1

| | VISCOSITY (Centipoises) AFTER AGING (Times are Cumulative) | | | | |
|---|---|---|---|---|---|
| SOLUTION | 10 Min. | 24 Hrs. | 10 Days | 25 Days | 36 Days |
| Example I | 1177 | 1093 | 1000 | 823 | 807 |
| Example II | 1370 | 1327 | 1050 | 650 | 683 |
| Example III | 1620 | 1600 | 1490 | 1277 | 1297 |

From the results of Examples I and II shown in Table 1 above, it can be seen that aqueous ammonium sulfate solutions can be thickened with ordinary guar gum polymers. However, severe viscosity loss appears to develop with age, i.e., 30–50 percent in 36 days. Viscosity loss is significantly less in the solution of Example III (ammonium phosphate solution) which experienced only a 20 percent loss in viscosity in the same time period. This may be the reason prior art ammonium sulfate fire retardant compositions were thickened with clay instead of guar gum polymers.

The superior viscosity stability effects of the present invention can be exhibited with aqueous ammonium sulfate solutions or with admixtures of aqueous solutions containing one or more ammonium salts in addition to ammonium sulfate. Thus, the aqueous fire retardant solutions may contain, as the fire retarding chemical, a mixture of ammonium sulfate with, for example, monoammonium phosphate or diammonium phosphate.

EXAMPLES IV-X

To illustrate the outstanding viscosity stability of such compositions, seven aqueous solutions were prepared with ammonium sulfate and with variable phosphorus-sulfur mole ratios in the chemical retardant. The solutions differed somewhat in their pH. Each solution contained 8.7 grams of a polygalactomannan derivative within the scope of this invention, viz., hydroxypropyl ether of guar gum. Each of the 7 aqueous solutions also contained 1.4 grams of ferric oxide; 2.8 grams of tricalcium phosphate; 0.3 grams of a sulfur-containing corrosion inhibitor; and approximately 4 grams (total) of several additives customarily found in such fire retardant solutions.

Table 2 enumerates the principal constituents in the 7 aqueous solutions being studied.

TABLE 2

Principal Non-Aqueous Constituents of Fire Retardant Solutions

| Chemical | Solution Number | | | | | | |
|---|---|---|---|---|---|---|---|
| | 4 | 5 | 6 | 7 | 8 | 9 | 10 |
| Diammonium Phosphate, grams | 0 | 0 | 0 | 0 | 79.8 | 59.9 | 39.9 |
| Monoammonium Phosphate, grams | 0 | 92.3 | 54.7 | 20.9 | 0 | 0 | 0 |
| Ammonium Sulfate, grams | 105.4 | 27.5 | 65.0 | 98.9 | 39.9 | 59.9 | 79.8 |
| Hydroxypropyl Ether Guar Gum, grams | 8.7 | 8.7 | 8.7 | 8.7 | 8.7 | 8.7 | 8.7 |
| Phosphorus/Sulfur Mole Ratio | — | 2.0 | 1.0 | 0.5 | 2.0 | 1.0 | 0.5 |
| Solution pH | 6.2 | 4.4 | 4.6 | 4.8 | 6.85 | 6.7 | 6.5 |
| Weight % Total Ingredients in water | 25% | 12% | 12% | 12% | 12% | 12% | 12% |

After preparation of the solutions noted in Table 2 above, each solution was allowed to stand at 23° C. and the viscosity (in centipoises) was determined using a Model LTV Brookfield viscometer, Spindle No. 4 at 60 revolutions per minute.

Table 3 below presents viscosity stability (aging) data for each of the 7 solutions of Table 2.

TABLE 3

| | VISCOSITY (Centipoises) AFTER AGING (Times are Cumulative) | | | | | | |
|---|---|---|---|---|---|---|---|
| Solution Number | 0 Days | 1 Day | 5 Days | 7 Days | 9 Days | 13 Days | 30 Days |
| 4 | 2670 | 2790 | — | 2643 | 2547 | — | 2530 |
| 5 | 1630 | 1705 | — | 1750 | 1700 | 1680 | 1713 |
| 6 | 1590 | 1650 | — | 1700 | 1650 | 1650 | 1667 |
| 7 | 1560 | 1600 | — | 1620 | 1580 | 1580 | 1617 |
| 8 | 1650 | 1670 | 1610 | 1550 | — | 1470 | 1433 |
| 9 | 1600 | 1580 | 1540 | 1490 | — | 1380 | 1330 |
| 10 | 1560 | 1560 | 1520 | 1460 | — | 1400 | 1330 |

While this invention has been described with respect to specific examples and embodiments, it is to be understood that the invention is not limited thereto and that it can be variously practiced within the scope of the following claims.

The embodiments of this invention in which the exclusive property or privilege is claimed are defined as follows:

1. A composition comprising:
   (a) from about 10 to about 90 percent by weight of ammonium sulfate;
   (b) from 0 to about 90 percent by weight of an ammonium salt selected from the group consisting of monoammonium orthophosphate; diammonium orthophosphate; monoammonium pyrophosphate; diammonium pyrophosphate; triammonium pyrophosphate; tetraammonium pyrophosphate; ammonium, substituted ammonium, amide and melamine polyphosphates; ammonium-alkali metal mixed salts of ortho-, pyro- and polyphosphates; ammonium-alkaline earth metal mixed salts of ortho-, pyro- and polyphosphates; and mixtures thereof; and
   (c) from about 0.1 to about 30 percent by weight of a polygalactomannan derivative selected from the group consisting of carboxyalkyl ethers of polygalactomannans and hydroxyalkyl ethers of polygalactomannans.

2. A composition according to claim 1 wherein component (a) is present at from about 30 to about 90 percent by weight, component (b) is present at from about 0 to about 70 percent by weight and component (c) is present at from about 1 to about 15 percent by weight.

3. A composition according to claim 1 wherein the degree of substitution for the polygalactomannan derivative is from about 0.03 to about 2.0.

4. A composition according to claim 1, 2 or 3 wherein the polygalactomannan derivative is a hydroxyalkyl ether of a polygalactomannan.

5. A composition according to claim 4 wherein the polygalactomannan derivative is a hydroxyethyl or hydroxypropyl ether of a polygalactomannan.

6. A composition according to claim 4 wherein the polygalactomannan is guar gum.

7. A composition according to claim 5 wherein the polygalactomannan is guar gum.

8. A composition according to claim 1, 2 or 3 wherein the polygalactomannan derivative is a carboxyalkyl ether of a polygalactomannan in which said alkyl has from 1 to about 3 carbon atoms.

9. A composition according to claim 8 wherein the polygalactomannan is guar gum.

10. A fire retardant composition which comprises an aqueous solution of:
  (a) from about 5 to about 40 percent by weight of ammonium sulfate;
  (b) from 0 to about 20 percent by weight of an ammonium salt selected from the group consisting of monoammonium orthophosphate; diammonium orthophosphate; monoammonium pyrophosphate; diammonium pyrophosphate; triammonium pyrophosphate; tetraammonium pyrophosphate; ammonium, substituted ammonium, amide and melamine polyphosphates; ammonium-alkali metal mixed salts of ortho-, pyro- and polyphosphates; ammonium-alkaline earth metal mixed salts of ortho-, pyro- and polyphosphates; and mixtures thereof; and
  (c) from about 0.005 to about 5.0 percent by weight of a polygalactomannan derivative selected from the group consisting of carboxyalkyl ethers of polygalactomannans and hydroxyalkyl ethers of polygalactomannans.

11. A composition according to claim 10 wherein component (a) is present at from about 20 to about 40 percent by weight, component (b) is present at from about 0 to about 10 percent by weight, and component (c) is present at from about 0.01 to about 3 percent by weight.

12. A composition according to claim 10 wherein the degree of substitution for the polygalactomannan derivative is from about 0.03 to about 2.0.

13. A composition according to claim 10, 11 or 12 wherein the polygalactomannan derivative is a hydroxyalkyl ether of a polygalactomannan.

14. A composition according to claim 13 wherein the polygalactomannan derivative is a hydroxyethyl or hydroxypropyl ether of a polygalactomannan.

15. A composition according to claim 13 wherein the polygalactomannan is guar gum.

16. A composition according to claim 14 wherein the polygalactomannan is guar gum.

17. A composition according to claim 10, 11 or 12 wherein the polygalactomannan derivative is a carboxyalkyl ether of a polygalactomannan in which said alkyl has from 1 to about 3 carbon atoms.

18. A composition according to claim 17 wherein the polygalactomannan is guar gum.

19. A composition according to claim 10, 11 or 12 which further comprises a corrosion inhibitor.

20. A composition according to claim 16 which further comprises a corrosion inhibitor.

21. A composition according to claim 18 which further comprises a corrosion inhibitor.

* * * * *